3,113,931
ACTIVATION OF PLATINUM TYPE REFORMING CATALYSTS
Sterling E. Voltz, Media, Pa., assignor to Sun Oil Company, a corporation of New Jersey
No Drawing. Filed Mar. 15, 1960, Ser. No. 15,067
14 Claims. (Cl. 252—442)

This invention relates to platinum type catalysts for reforming hydrocarbons of the gasoline range and more particularly concerns a novel method for activating reforming catalysts composed of a group VIII noble metal on alumina, which are herein referred to as platinum type reforming catalysts.

Catalytic reforming of petroleum hydrocarbons for the purpose of producing gasoline fractions of high antiknock quality or aromatic hydrocarbons such as benzene, toluene and xylenes is widely practiced in the petroleum industry. The most successful type of catalyst for this purpose presently is platinum-on-alumina, with the composition containing a small amount of platinum generally in the range of 0.1–2.0% by weight. Catalysts of this type are available commercially from several sources and have been described, for example, in United States Patent Nos. 2,479,110; 2,550,531; 2,723,947; 2,838,444; and 2,838,445. These catalysts differ usually in the form of the alumina component which depends upon the manner in which it was prepared. The compositions may include various active forms of alumina, such as gamma, eta and kappa, and the aluminas may vary considerably in surface characteristics depending upon how the catalyst was made. The combination of platinum and the alumina produces a catalyst having a plurality of functions whereby such reactions as dehydrogenation, isomerization, cyclization and cracking are promoted. In some cases a minor amount of a halogen, such as chlorine or fluorine, is incorporated in the catalyst to control the catalytic activity for promoting certain types of these reactions. The reforming operation customarily is carried out in the presence of a large amount of hydrogen to inhibit coke formation on the catalyst. After a long period of operation, however, coke eventually will build up on the catalyst and require that it be replaced or regenerated by burning off the carbon. Some of the commercial platinum-on-alumina catalysts can be regenerated in situ several times before the loss in inherent activity has become excessive, thus allowing many months of operation before the catalyst needs to be replaced.

Before starting a reforming operation with a platinum type catalyst as discussed above, the catalyst generally is subjected to an activating treatment. Conventionally this is done by heating the catalyst to a temperature in the range of 500–1000° F. and contacting it with a stream of hydrogen. This treatment is thought to effect reduction of the platinum component and it may also have a beneficial effect on the alumina component as by drying or other effects. However, in some cases the treatment with hydrogen has been found to have an adverse effect on the catalyst possibly by damaging the function of the platinum component. Consequently a more effective and safer means of activating the catalyst prior to the reforming operation is desirable.

The present invention is directed to an improved method of activating platinum type reforming catalysts, which method results in catalysts particularly having enhanced aromatizing ability. The invention is applicable not only to the various types of platinum-on-alumina catalysts such as are disclosed in the aforementioned patents but also to catalysts composed of the other group VIII noble metals, namely, palladium, ruthenium, rhodium, osmium and iridium, supported on an active alumina base. The activation treatment beneficially can be applied to fresh catalyst prior to starting a reforming operation as well as to used catalysts which have been regenerated by burning off carbon deposited therein in a previous reforming operation.

According to the invention, a platinum type reforming catalyst is activated by contact with an organo-aluminum compound having the empirical formula $AlR_nX_m$, wherein R is a hydrocarbon radical having 1–10 carbon atoms, X is chlorine, fluorine or bromine, $n$ is from 1 to 3 and $m$ is from 0 to 2, the sum of $n$ and $m$ being 3. Thus the treating agent of the invention can be an aluminum trialkyl or triaryl, a dialkyl or diaryl aluminum monohalide or a monoalkyl or monoaryl aluminum dihalide. Following contact of the catalyst with the organo-aluminum compound, the catalyst is heated substantially in the absence of oxygen and water to a temperature sufficient to decompose the organo-aluminum compound. It has been found that such treatment produces a catalyst of unusually high activity, particularly with respect to its aromatizing function. The improved catalyst can be used to advantage in hydroreforming operations for the purpose of producing aromatic hydrocarbons such as benzene, toluene and xylenes or for making gasoline stocks of high anti-knock quality.

The preferred organo-aluminum compounds for practicing the invention are the trialkyls and the dialkyl-monohalides in which each alkyl group has 2 to 4 carbon atoms. Examples are aluminum triethyl, aluminum tripropyl, aluminum triisobutyl, diethyl aluminum chloride, and dibutyl aluminum chloride. However, any of the other organo-aluminum compounds conforming to the above specified generic formula are effective for obtaining the desired catalytic activation. Examples of other non-halogen containing treating agents are aluminum trimethyl, aluminum triisopentyl, aluminum trihexyl, aluminum trioctyl, aluminum tridecyl, and aluminum triphenyl. Examples of other halogen-containing treating agents are dimethyl aluminum fluoride, methyl aluminum dibromide, aluminum sesquichloride, diisobutyl aluminum chloride, butyl aluminum difluoride, diheptyl aluminum chloride, nonyl aluminum dibromide and ethyl phenyl aluminum chloride.

One manner of carrying out the treatment with the organo-aluminum compound comprises dissolving the compound in a suitable solvent, such as pentane, hexane, heptane, octane, benzene, xylenes and the like, and impregnating the catalyst mass with the solution. The organo-aluminum treating agent is absorbed or adsorbed by the catalyst and excess solvent can be drained off. The amount of treating agent incorporated into the catalyst should be in the range of 0.1–20% by weight based on the catalyst and more preferably 0.5–10%. The catalyst is then heated, preferably by means of a hot stream of hydrogen or nitrogen, to a temperature sufficient to decompose the organo-aluminum compound. This temperature may vary depending upon the particular aluminum compound selected as treating agent but generally will be substantially above the boiling point of the compound. Preferably the catalyst is heated in this manner to a temperature within the range of 500–1000° F. This heat treatment serves to remove residual solvent from the catalyst as well as to decompose the treating agent. It is thought that the decomposition results in removal of the organic portion of the coupound, leaving in the catalyst the aluminum comined in some form that may be particularly active catalytically. The organo-aluminum compound also is thought to react with any water, free oxygen, sulfur compounds and the like that may be present in the catalyst, as well as to reduce the platinum therein to a more catalytically active form. When the treating agent is a halogen-containing aluminum compound, e.g. diethyl aluminum chloride or aluminum sesquichloride, the halogen may be incorporated into the catalyst and serve to enhance certain of its catalytic functions. It is to be understood, however, that the explanations given above as to the mechanisms by which activation is achieved are somewhat speculative and that the exact functions of the organo-aluminum treating agents are not known with certainty at present.

Another manner of carrying out the treatment with the organo-aluminum compound involves passing a hot hydrogen or nitrogen stream into a vessel containing a batch of the aluminum compound under conditions causing the compound to vaporize preferably slowly into the gas stream. The gas carrying a small proportion of the aluminum compound is then passed into the catalyst bed wherein the compound is absorbed. In this manner the aluminum compound in a proportion in the range of 0.1–20% by weight, more preferably 0.5–10%, is incorporated into the catalyst. Thereafter, a stream of hydrogen or nitrogen alone is passed through the catalyst at a high enough temperature to cause decomposition of the aluminum compound, preferably at a temperature in the range of 500–1000° F. During the step of passing the gas stream containing the treating agent into the catalyst, the direction of flow through the catalyst can be varied one or more times to aid in securing more even distribution of the aluminum compound throughout the catalyst mass.

The effect of the activating treatment of platinum-on-aluminum reforming catalysts according to the present invention is illustrated more specifically by the following examples:

*Example I*

Five reforming runs for converting n-heptane by means of a commercial platinum-on-alumina catalyst containing about 0.6% platinum by weight were made, employing different activating pretreatments for comparison. In two runs, the catalyst pretreatment involved contacting it at 500° C. for about one hour with either nitrogen (run A) or hydrogen (run B). In the other three runs the catalyst was first impregnated with a solution of aluminum triisobutyl in n-heptane and then was heated by a stream of either nitrogen or hydrogen at 500° C. for one hour. In run C, 1% by weight of aluminum triisobutyl was absorbed in the catalyst and nitrogen was used in the heating step. In runs D and E, 12% of aluminum triisobutyl was absorbed in the catalyst and the catalyst thereafter was heated by means of nitrogen and hydrogen, respectively. The thus prepared catalyst materials were used for converting n-heptane in the absence of added hydrogen and under the following reaction conditions: temperature=500° C.; pressure=atmospheric; liquid hourly space velocity=2.0 vols. n-heptane/vol. catalyst/hr.; onstream time=1 hour. Results were as follows:

| | Wt. Percent Aluminum Triisobutyl | Heating Gas | Liquid Product | | Gas Produced, Wt. Percent | Coke Make, Wt. Percent |
|---|---|---|---|---|---|---|
| | | | Percent Aromatics | Percent Olefins | | |
| Run A | None | $N_2$ | 4 | 14 | 1.9 | 2.2 |
| Run B | None | $H_2$ | 11 | 9 | 4.4 | 2.7 |
| Run C | 1 | $N_2$ | 15 | 9 | 3.2 | 3.1 |
| Run D | 12 | $N_2$ | 24 | 9 | 9.6 | 2.3 |
| Run E | 12 | $H_2$ | 18 | 12 | 14.6 | 2.7 |

A comparison of runs A and C shows that the use of 1% aluminum triisobutyl increased the aromatic yield almost four-fold. It also substantially improved the aromatic yield as compared to conventional hydrogen reduction of the catalyst (run B). Runs D and E show that still further improvement in conversion of n-heptane to aromatics can be effected by using larger amounts of the organo-aluminum treating agent. If hydrogen had been used as in conventional reforming operations, substantially lower coke makes would have resulted.

*Example II*

Four runs were made using catalyst samples prepared in the same way as in runs A, B, D, and E, respectively, and with the same reaction conditions as in the preceding example except that in this case methylcyclopentane was the charge hydrocarbon. The following results were obtained:

| | Wt. Percent Aluminum Triisobutyl | Heating Gas | Liquid Product | | Gas Produced, Wt. Percent | Coke Make, Wt. Percent |
|---|---|---|---|---|---|---|
| | | | Percent Aromatics | Percent Olefins | | |
| Run F | None | $N_2$ | 3 | 7 | 1.2 | 3.6 |
| Run G | None | $H_2$ | 4 | 6 | 0.9 | 0.3 |
| Run H | 12 | $N_2$ | 10 | 12 | 2.2 | 5.6 |
| Run J | 12 | $H_2$ | 10 | 13 | 2.3 | 5.9 |

Comparisons of the aromatic and olefin contents of the liquid products for runs F and H and for runs G and J show that treatment of the catalyst with the organo-aluminum compound prior to heating with either nitrogen or hydrogen substantially increases the catalytic activity.

*Example III*

A gel-type platinum-on-alumina reforming catalyst from another commercial source and having 0.5% by weight of platinum was used for converting n-heptane under the same conditions as described in Example I. Two runs were made in one of which the catalyst pretreatment consisted merely of heat treatment with hydrogen at 500° C. for one hour, while in the other the pretreatment involved contact with aluminum triisobutyl in heptane followed by heat treatment at 500° C. for one hour in a stream of nitrogen. Results were as follows:

| Wt. Percent Aluminum Triisobutyl | Heating Gas | Wt. Percent Aromatics in Liquid Products |
|---|---|---|
| None | $H_2$ | 7 |
| 8.7 | $N_2$ | 13 |

As shown by these results, activation with aluminum triisobutyl almost doubled the aromatic content of the reaction product as compared to conventional activation with hydrogen.

In the foregoing examples rather mild reforming conditions were employed as a means of readily distinguishing the differences in activities of the catalysts. Considerably higher degrees of conversion of the charge hydrocarbons could have been effected by using more severe conditions, particularly by reducing the space rate.

When other organo-aluminum compounds as herein defined are used as the treating agent in place of aluminum triisobutyl, substantially similar results are obtained. Also, the activating treatment herein described is similarly effective for other platinum type reforming catalysts containing other group VIII noble metals in place of platinum.

I claim:

1. Method of activating a group VIII noble metal-on-alumina reforming catalyst which comprises contacting the catalyst with an organo-aluminum compound having the empirical formula $AlR_nX_m$ wherein R is a hydrocarbon radical having 1–10 carbon atoms, X is selected from the group consisting of chlorine, fluorine and bromine, $n$ is from 1 to 3 and $m$ is from 0 to 2, the sum of $n$ and $m$ being 3, the amount of said organo-aluminum compound used being in the range of 0.1–20% by weight based on the catalyst, and thereafter directly heating the catalyst having said organo-aluminum compound absorbed thereon substantially in the absence of oxygen and water to a temperature sufficient to decompose said compound.

2. Method according to claim 1 wherein R is an alkyl group.

3. Method according to claim 2 wherein X is chlorine.

4. Method according to claim 1 wherein said organo-aluminum compound is an aluminum trialkyl.

5. Method according to claim 1 wherein said organo-aluminum compound is an aluminum alkyl halide.

6. Method according to claim 5 wherein said organo-aluminum compound is an aluminum dialkyl monochloride in which the alkyl groups each have 2–4 carbon atoms.

7. Method according to claim 1 wherein said heating is carried out by passing through the catalyst a hot gas selected from the group consisting of hydrogen and nitrogen.

8. Method according to claim 1 wherein the organo-aluminum compound is dissolved in a hydrocarbon solvent and the solution is contacted with the catalyst.

9. Method according to claim 1 wherein the organo-aluminum compound is contacted with the catalyst by passing into the catalyst a heated gas stream selected from the group consisting of hydrogen and nitrogen and carrying the organo-aluminum compound in vapor form.

10. Method of activating a platinum-on-alumina reforming catalyst containing 0.1–2.0% platinum by weight which comprises contacting the catalyst with an organo-aluminum compound having the empirical formula $AlR_nX_m$ wherein R is a hydrocarbon radical having 1–10 carbon atoms, X is selected from the group consisting of chlorine, fluorine and bromine, $n$ is from 1 to 3 and $m$ is from 0 to 2, the sum of $n$ and $m$ being 3, the amount of said organo-aluminum compound used being in the range of 0.1–20% by weight based on the catalyst, and then directly contacting the catalyst having said organo-aluminum compound absorbed thereon with hot gas selected from the group consisting of hydrogen and nitrogen at a temperature in the range of 500–1000° F.

11. Method according to claim 10 wherein R is an alkyl group and the amount of said organo-aluminum compound used is 0.5–10% by weight based on the catalyst.

12. Method according to claim 11 wherein said organo-aluminum compound is an aluminum trialkyl in which the alkyl groups each have 2–4 carbon atoms.

13. Method according to claim 10 wherein said organo-aluminum compound is an aluminum alkyl halide and the amount used is 0.5–10% by weight based on the catalyst.

14. Method according to claim 13 wherein said organo-aluminum compound is an aluminum dialkyl monochloride in which the alkyl groups each have 2–4 carbon atoms.

References Cited in the file of this patent
UNITED STATES PATENTS

| | | |
|---|---|---|
| 2,909,512 | Bruce | Oct. 20, 1959 |
| 3,047,514 | Burk et al. | July 31, 1962 |